United States Patent Office 3,433,806
Patented Mar. 18, 1969

3,433,806
METHOD FOR THE PREPARATION OF DIOXENES AND DIOXADIENES
Stanley B. Cavitt, Austin, Tex., assignor to Jefferson Chemical Company, Inc., Houston, Tex., a corporation of Delaware
No Drawing. Filed Dec. 27, 1965, Ser. No. 516,775
U.S. Cl. 260—340.6        6 Claims
Int. Cl. C07d *15/00, 15/12*

ABSTRACT OF THE DISCLOSURE

The disclosure is a method for the preparation of dioxenes and dioxadienes by the pyrolysis of a substituted dioxane over a noble metal catalyst. Dioxenes and dioxadienes may be polymerized in the presence of acid catalysts.

---

This invention is concerned with a method for the preparation of dioxenes and dioxadienes. More particularly, this invention is concerned with a method for the preparation of dioxenes and dioxadienes by the pyrolysis of a substituted dioxane over a noble metal catalyst.

Dioxenes and dioxadienes are highly reactive chemical intermediates which may be easily polymerized in the presence of acid catalysts. Dioxenes have previously been prepared in small scale in the laboratory. For example, 2,5-dimethyl-2,5-dimethoxy-1,4-dioxane has been treated with p-toluenesulfonic acid to give a 43% yield of 2,5-dimethyl-5-methoxy-1,4-dioxene. No dioxadiene was obtained. Such preparations are of limited utility because the unsaturated products are easily polmerized by the acids. The same product has been obtained by reaction over asbestos and by decomposition in a silver vessel. In neither case was the corresponding dioxadiene observed. 2,5-dimethyl-1,4-dioxadiene was obtained by Summerbell and Lestina, J. Am. Chem. Soc. 79, 6219 (1957), by dehydrohalogenation of 2,5-bis(iodomethyl)-1,4-dioxane. Such a synthesis may be utilized in the laboratory, but is not feasible for a commercial operation.

I have now discovered a process whereby a dioxene or a dioxadiene may be selectively obtained from a dioxane as described hereinbelow by the proper choice of reaction conditions and the proper choice of catalyst. The dioxane to be utilized in my process is one corresponding to one of the formulae:

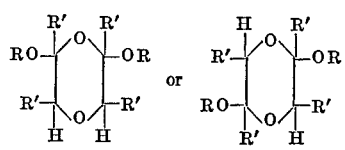

wherein R is selected from the class consisting of hydrogen, $C_1$–$C_{12}$ alkyl, $C_5$–$C_8$ cycloalkyl, aryl and $C_2$–$C_{10}$ acyl and R' is selected from the class consisting of hydrogen, $C_1$–$C_{10}$ alkyl, $C_5$–$C_8$ cycloalkyl and aryl. Examples of dioxanes that may be employed include 2,5-dimethyl-2,5-dimethoxy-1,4-dioxane,
2,5-diethoxy-1,4-dioxane,
3,6-dimethyl-2,5-dimethoxy-1,4-dioxane,
2,5-diphenoxy-1,4-dioxane,
2,6-bis(acetoxy)-1,4-dioxane and
2,6-dimethoxy-3,5-dicyclohexyl-1,4-dioxane.

The preferred dioxane for use in my process is 2,5-dimethoxy-2,5-dimethyl-1,4-dioxane.

The catalysts for my process are the noble metals such as, for example, silver, gold, platinum, palladium and ruthenium. These metals are preferably supported on an inert support such as carbon or diatomaceous earth. A particularly effective catalyst is silver supported on diatomaceous earth. The reaction may be run in a batch manner by slurrying the catalyst with the dioxane at the desired temperature. However, it is preferred to conduct the reaction in a contniuous manner by passing the dioxane over a fixed catalyst bed at the desired temperature.

The dioxane may be selectively converted to the dioxene or dioxadiene depending upon the temperature employed in the reaction. At a temperature of from about 140° to 170° C. the product is the dioxene, while at temperatures from about 200° to about 400° C. and, preferably, from about 275° to about 400° C., the product is the dioxadiene. It is to be understood that the dioxene obtained at the lower temperature may be converted to the dioxadiene by treating it at the higher temperature.

The reaction is preferably conducted at or about atmospheric pressure. Pressure is not a critical variable. Inert solvents such as alkanes, cycloalkanes, aromatics and dioxane may be employed. Such solvents are particularly useful when the starting material is a solid. In addition, inert gaseous diluents such as nitrogen may also be employed.

My process will be further illustrated by the following examples.

EXAMPLE I

To a 250 ml. flask equipped with a magnetic stirrer, condenser and a Kontes distillate collector adapter were added 44.0 grams (0.25 mol) of recrystallized 2,5-dimethoxy-2,5-dimethyl-1,4-dioxane and 1.0 gram of a 1% platinum on charcoal catalyst. The flask was shaken thooughly to dry mix the ingredients and then placed in a silicone oil bath where it was heated to a temperature of 145°–160° C. The by-product methanol was withdrawn overhead followed by the dioxane product. Light suction was applied near the end of the reaction to minimize holdup and other losses. Distillation of the 2,5-dimethyl-5-methoxy-1,4-dioxene through a 1-inch by 24-inch jacketed silvered column packed with glass helices gave a fraction boiling at 76°–77° C. at 37 mm. pressure which had a purity of 99.8 area percent by chromatographic analysis. The yield was 34 grams or 94%. The product had an index of refraction of 1.4389 and a density of 1.0432.

EXAMPLE II

Example I was repeated using 1 gram of a 1% palladium on carbon catalyst at a temperature of 150°–155° C. The yield was 32 grams or 89%.

EXAMPLE III

Example I was repeated using 0.2 gram of a 5% ruthenium on carbon catalyst at a temperature of 155°–160° C. The yield was 30 grams or 83%.

EXAMPLE IV

A 25% solution of 2,5-dimethyl-5-methoxy-1,4-dioxene in benzene was continuously charged through a preheater to a reactor containing 85 grams of a silver on diatomaceous earth catalyst. The preheater was packed with #316 stainless steel rings. The feed was passed through the reactor at a rotometer setting of 2.0 while nitrogen was being simultaneously fed to the reaction at the same flow rate. Various temperature ranges were employed and samples were taken for chromatographic analysis. Two isomers of the dioxadiene were obtained and will be referred to as I and II. Reaction temperatures and analyses are reported in the following table:

TABLE 1

| Sample No. | Preheater temp., °C. | Reactor temp., °C. | Dioxadienes, area, percent | | Unconverted dioxene, area percent |
|---|---|---|---|---|---|
| | | | I | II | |
| 1 | 306–309 | 299–302 | 43.3 | 29.4 | 27.3 |
| 2 | 339–343 | 340–345 | 55.9 | 32.9 | 11.2 |
| 3 | 348–354 | 376–380 | 60.6 | 34.0 | 5.4 |
| 4 | 386–390 | 384–400 | 59.9 | 34.8 | 5.3 |

The product samples were treated with several drops of quinoline to remove traces of acid, if present, and stored in ice prior to distillation. Separation of most of the benzene, methanol and unconverted dioxene from the product mixture was accomplished by flash distillation through a short pass distillation head at atmospheric pressure. There were recovered 163 grams of a yellow-green distillate (mainly dioxadiene isomers), boiling point 101° to 150° C., a large quantity of benzene-dioxadiene mixture, boiling point 81° to 101° C., and 48 grams of dark residue, primarily unconverted starting material. The benzene-dioxadiene mixture was fractionated at atmospheric pressure through a 1-inch by 24-inch jacketed column packed with glass helices to a solution temperature of 130° C. in order to separate most of the benzene. The residue from this distillation weighed 63 grams and contained dioxadiene isomers and was combined with the 163 grams previously recovered. This product mixture was fractionated at 60 mm. pressure at a 5:1 reflux ratio in a nitrogen atmosphere to give 93 grams consisting mainly of dioxadienes, boiling point 57° to 58.5° C. at 60 mm.

A compound having structure I was previously reported in the literature. The major isomer from this example was found to be identical to the material previously reported as having structure I. The minor isomer was shown by nuclear magnetic resonance to be 2,3-dihydro-2-methylene-5-methyl-1,4-dioxadiene (II). This compound has not previously been prepared and represents a new composition of matter.

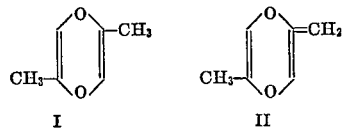

I        II

The nuclear magnetic resonance data were obtained on a Varian A-60 instrument using carbon tetrachloride as a solvent. Chemical shift data are given as p.p.m. downfield of tetramethylsilane as an internal reference. Compound II contributed the following bands:

(1) A methyl doublet at 1.63 p.p.m. ($J_3$) = 1.3 c.p.s.

(2) A complex multiplet at 4.09 p.p.m., consisting of at least five bands (shown by spin-decoupling to be coupled to a ring olefinic proton downfield at 5.87 p.p.m. ($J_4$) = 0.7 c.p.s.). This band was assigned to an exomethylene proton in a transoid configuration with the olefinic proton:

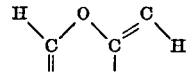

(3) A doublet at 4.24 p.p.m. in the cyclic —O—CH$_2$— region ($J_5$) = 0.6 c.p.s., assigned to the ring —CH$_2$— and assumed to be coupled to the exomethylene proton of band 2.

(4) A doublet at 4.44 p.p.m., assigned to the other exomethylene proton, and assumed to be coupled with its exomethylene partner ($J_6$) = 1.5 c.p.s.

(5) A complex multiplet at 5.87 p.p.m., assigned to the ring olefinic proton (coupled to band 2).

The proton ratios were approximately 3:1:2:1:1, respectively, which is correct for the structure.

EXAMPLE V

This example was conducted in a manner similar to that of Example IV. The reactor feed was prepared by dissolving 27.7 grams of 2,5-dimethoxy-2,5-dimethyl-1,4-dioxane in sufficient benzene to give 368 grams of a 7.53% solution. The reaction was conducted with a preheater temperature range of 292–297° C. and a reactor temperature range of 303°–306° C. Chromatographic analysis of the reactor effluent revealed that conversion of the dioxane was approximately 95% with two major product peaks corresponding to those observed for the two dioxadiene isomers described in Example IV.

Having thus described my invention, I claim:

1. A method for the selective conversion of a dioxane selected from the class having the formulae:

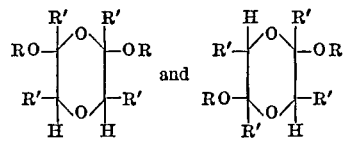

wherein R is selected from the group consisting of hydrogen and $C_1$–$C_{10}$ alkyl, and R' is selected from the group consisting of hydrogen and $C_1$–$C_{10}$ alkyl, to the corresponding dioxene and dioxadiene which comprises heating said dioxanes at a temperature of from about 140° to about 400° C. in the presence of a noble metal catalyst, said dioxene being substantially selectively formed when the heating is conducted at a temperature of about 140° to about 170° C. and said dioxadiene being substantially selectively formed when the heating is conducted at a temperature of about 200° to about 400° C.

2. A method as in claim 1 wherein the noble metal catalyst is supported on an inert support.

3. A method as in claim 2 wherein the catalyst is silver supported on diatomaceous earth.

4. A method as in claim 3 wherein the dioxane is 2,5-dimethoxy-2,5-dimethyl-1,4-dioxane.

5. A method as in claim 4 wherein the reaction is conducted at a temperature of 275° to 400° C. to obtain the dioxadiene product.

6. A method as in claim 1 wherein the noble metal catalyst is platinum, palladium, ruthenium, silver or gold.

References Cited

UNITED STATES PATENTS 3,072,623    1/1963    Field _____ 260—340.6 X

ALEX MAZEL, Primary Examiner.

JAMES H. TURNIPSEED, Assistant Examiner.

U.S. Cl. X.R.

260—88.3